(12) United States Patent
Okazaki et al.

(10) Patent No.: US 9,805,390 B2
(45) Date of Patent: Oct. 31, 2017

(54) DISPLAY CONTROL APPARATUS, DISPLAY CONTROL METHOD, AND PROGRAM

(75) Inventors: Tomohiko Okazaki, Kanagawa (JP); Michinari Kohno, Tokyo (JP); Yoichi Kobori, Kanagawa (JP); Yoshiki Tanaka, Tokyo (JP); Fujio Nobori, Kanagawa (JP); Mitsuhiro Hosoki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 948 days.

(21) Appl. No.: 13/467,386

(22) Filed: May 9, 2012

(65) Prior Publication Data

US 2012/0306911 A1    Dec. 6, 2012

(30) Foreign Application Priority Data

Jun. 2, 2011 (JP) ................. 2011-124346

(51) Int. Cl.
*G09G 5/14* (2006.01)
*G06Q 30/02* (2012.01)
*G09F 27/00* (2006.01)

(52) U.S. Cl.
CPC ......... *G06Q 30/0251* (2013.01); *G09F 27/00* (2013.01)

(58) Field of Classification Search
CPC .................................................. G06T 11/60
USPC ....................................................... 345/625
See application file for complete search history.

(56) References Cited

U.S. PATENT DOCUMENTS

| | | | | |
|---|---|---|---|---|
| 6,005,574 A | * | 12/1999 | Herrod | 715/807 |
| 6,500,008 B1 | * | 12/2002 | Ebersole | A62C 99/0081 345/441 |
| 6,614,422 B1 | * | 9/2003 | Rafii | G06F 1/1626 345/156 |
| 7,479,967 B2 | * | 1/2009 | Bachelder | G06T 19/003 345/592 |
| 7,934,171 B2 | * | 4/2011 | Hey | G06F 3/04812 715/763 |
| 8,139,751 B1 | * | 3/2012 | Magsamen, Jr. | H04L 51/20 379/265.01 |
| 8,165,916 B2 | * | 4/2012 | Hoffberg et al. | 705/14.53 |
| 8,489,452 B1 | * | 7/2013 | Warner | G06Q 30/0226 705/14.34 |
| 8,718,401 B2 | * | 5/2014 | Tokunaga | G06T 3/4038 345/625 |

(Continued)

FOREIGN PATENT DOCUMENTS

| | | | |
|---|---|---|---|
| EP | 1292111 A1 | * 3/2003 | |
| JP | EP 1292111 A1 | * 3/2003 | ........... G09F 3/0288 |

(Continued)

OTHER PUBLICATIONS

Kwanrattana Songsathaporn et al. "Interactive Texturing on Objects in Images via a Sketching Interface" Apr. 28-30, 2011, ACM.*

(Continued)

*Primary Examiner* — Javid A Amini
(74) *Attorney, Agent, or Firm* — Chip Law Group

(57) ABSTRACT

According to an illustrative embodiment, a display control method is provided. The method includes defining at least one clipping region, within an image to be displayed, according to detected object information, and defining clipping region content for displaying in the clipping region.

18 Claims, 10 Drawing Sheets

(56) References Cited

U.S. PATENT DOCUMENTS

| | | | | |
|---|---|---|---|---|
| 8,884,883 B2* | 11/2014 | Benko | | G06F 3/14 345/156 |
| 8,941,669 B1* | 1/2015 | Moreton | | G06F 9/4806 345/502 |
| 2001/0004400 A1* | 6/2001 | Aoki | | G06T 7/2053 382/107 |
| 2002/0184098 A1* | 12/2002 | Giraud et al. | | 705/14 |
| 2003/0068638 A1* | 4/2003 | Cork | | G01N 21/253 435/6.12 |
| 2003/0220830 A1* | 11/2003 | Myr | | G06Q 10/06 705/14.54 |
| 2004/0150619 A1* | 8/2004 | Baudisch | | G09G 5/08 345/157 |
| 2004/0196371 A1* | 10/2004 | Kono | | H04N 5/2251 348/162 |
| 2005/0163346 A1* | 7/2005 | van den Bergen | | G06K 9/00771 382/103 |
| 2005/0276481 A1* | 12/2005 | Enomoto | | G06K 9/00597 382/190 |
| 2006/0010400 A1* | 1/2006 | Dehlin | | G06F 3/0354 715/856 |
| 2007/0067104 A1* | 3/2007 | Mays | | G01C 21/36 701/437 |
| 2008/0037837 A1* | 2/2008 | Noguchi | | G06K 9/00335 382/118 |
| 2008/0126210 A1* | 5/2008 | Shanahan | | 705/14 |
| 2008/0181507 A1* | 7/2008 | Gope | | H04N 5/144 382/190 |
| 2008/0263012 A1* | 10/2008 | Jones | | G06F 17/30811 |
| 2008/0270172 A1* | 10/2008 | Luff et al. | | 705/1 |
| 2009/0099919 A1* | 4/2009 | Schultheiss | | G06Q 10/00 705/14.1 |
| 2009/0203440 A1* | 8/2009 | Ohba | | A63F 13/00 463/32 |
| 2009/0265243 A1* | 10/2009 | Karassner et al. | | 705/14.54 |
| 2009/0287554 A1* | 11/2009 | Kim | | 705/14.14 |
| 2009/0324065 A1* | 12/2009 | Ishida | | G06K 9/00456 382/164 |
| 2010/0004995 A1* | 1/2010 | Hickman | | G06Q 30/02 705/14.58 |
| 2010/0118200 A1* | 5/2010 | Gelman | | G06F 3/041 348/578 |
| 2010/0157049 A1* | 6/2010 | Dvir | | G08B 13/19608 348/143 |
| 2010/0166261 A1* | 7/2010 | Tsuji | | G06K 9/00228 382/103 |
| 2010/0209069 A1* | 8/2010 | Fountaine | | G11B 27/034 386/278 |
| 2010/0245382 A1* | 9/2010 | Sio | | G06T 13/80 345/593 |
| 2010/0302397 A1* | 12/2010 | Huang et al. | | 348/222.1 |
| 2010/0315542 A1* | 12/2010 | Yoshino | | H04N 1/0035 348/333.01 |
| 2011/0041150 A1* | 2/2011 | Schein et al. | | 725/32 |
| 2011/0045886 A1* | 2/2011 | Hayes et al. | | 463/11 |
| 2011/0045905 A1* | 2/2011 | Radek | | 463/31 |
| 2011/0060652 A1* | 3/2011 | Morton | | 705/14.58 |
| 2011/0080478 A1* | 4/2011 | Kohno et al. | | 348/143 |
| 2011/0145068 A1* | 6/2011 | King | | G06F 17/211 705/14.55 |
| 2011/0242130 A1* | 10/2011 | Toba | | G06T 11/00 345/629 |
| 2011/0282727 A1* | 11/2011 | Phan | | G06Q 10/10 705/14.36 |
| 2011/0302532 A1* | 12/2011 | Missig | | G06F 3/0416 715/823 |
| 2011/0304611 A1* | 12/2011 | Suzuki | | G06T 19/006 345/419 |
| 2012/0008830 A1* | 1/2012 | Yoshii | | G06T 7/0044 382/103 |
| 2012/0016733 A1* | 1/2012 | Belvin | | G06Q 30/02 705/14.41 |
| 2012/0062732 A1* | 3/2012 | Marman | | H04N 7/18 348/142 |
| 2012/0206339 A1* | 8/2012 | Dahl | | G06F 3/043 345/156 |
| 2012/0229610 A1* | 9/2012 | Fukushima | | G02B 27/2214 348/47 |
| 2013/0120123 A1* | 5/2013 | Aman et al. | | 340/323 R |
| 2013/0173402 A1* | 7/2013 | Young | | G06Q 30/0631 705/14.73 |
| 2013/0265382 A1* | 10/2013 | Guleryuz | | H04N 7/15 348/14.08 |
| 2014/0157209 A1* | 6/2014 | Dalal | | G06F 3/017 715/863 |

FOREIGN PATENT DOCUMENTS

| | | | |
|---|---|---|---|
| JP | 2010039726 A | * | 2/2010 |
| JP | 2010-102235 A | | 5/2010 |
| JP | 2010102235 A | * | 5/2010 |
| WO | WO 2004088474 A2 | * | 10/2004 |

OTHER PUBLICATIONS

3D Feature Extraction from Uncalibrated Video Clips, Arturo Donate, Oct. 29, 2010.*

Silhouette Clipping; Pedro V. Sander Xianfeng Gu Steven J. Gortler Hugues Hoppe John Snyder, ACM 2000.*

* cited by examiner

DISPLAY CONTROL APPARATUS, DISPLAY CONTROL METHOD, AND PROGRAM

CROSS-REFERENCE TO RELATED APPLICATION

The present application claims priority from Japanese Patent Application No. JP 2011-124346 filed in the Japanese Patent Office on Jun. 2, 2011, the entire content of which is hereby incorporated by reference herein.

BACKGROUND

The present disclosure relates to a display control apparatus, a display control method, and a program.

In recent years, display apparatuses capable of causing a display screen to display various kinds of information such as advertisements are installed in various places. For example, technology described in Japanese Patent Application Laid-Open No. 2010-102235 can be cited as a technology related to electronic advertisements.

SUMMARY

An electronic advertising system using the technology shown in Japanese Patent Application Laid-Open No. 2010-102235, for example, is provided with a camera or a sensor in a display apparatus that displays an image in a display screen to recognize attributes or a distance of a user standing in front of the display screen and causes the display screen to display display content based on a recognition result. Thus, for example, when an electronic advertising system as described above is used, the display screen may be caused to display an advertisement (an example of display content) fitting to the user viewing the display screen.

However, for example, if the technology shown in Japanese Patent Application Laid-Open No. 2010-102235 is used, regardless of whether the number of users to be recognized is one or more, the display screen can be caused to display only display content corresponding to one recognition result. Thus, for example, even if the technology shown in Japanese Patent Application Laid-Open No. 2010-102235 is used, it may not be possible to cause one user or two or more users viewing images (dynamic images or still images and this applies also below) shown in the display screen to recognize that display content displayed in the display screen is intended for the user or the users.

The present disclosure proposes a novel and improved display control apparatus capable of causing users viewing images shown in the display screen to recognize that display content is intended for the respective users, a display control method, and a program.

A display control method according to an illustrative embodiment includes defining at least one clipping region, within an image to be displayed, according to detected object information, and defining clipping region content for displaying in the clipping region.

DETAILED DESCRIPTION OF THE EMBODIMENT

Figure 1A:
FIG. 1A is an explanatory view providing an overview of processing of a display control method according to the present embodiment for a display control apparatus according to the present embodiment.

Hereinafter, preferred embodiments of the present disclosure will be described in detail with reference to the appended drawings. Note that, in this specification and the appended drawings, structural elements that have substantially the same function and structure are denoted by the same reference numerals, and repeated explanation of these structural elements is omitted.

The description will be provided in the order shown below:
1. Display Control Method According to the Present Embodiment
2. Display Control Apparatus According to the Present Embodiment
3. Program According to the Present Embodiment

Display Control Method According to the Present Embodiment

Before describing the configuration of a display control apparatus according to the present embodiment, a display control method according to the present embodiment will be described. It is assumed below that a display control apparatus according to the present embodiment performs processing of a display control method according to the present embodiment.

As described above, when, for example, like the technology described in Japanese Patent Application Laid-Open No. 2010-102235, the display screen is caused to display display content corresponding to one recognition result based on attributes, the distance or the like of a user standing in front of the display screen, the display screen may be caused to display display content fitting to the user viewing the display screen. However, as described above, even if the display screen is caused to display display content based on a recognition result, issues as shown below could arise:

If a plurality of users is present in front of the display screen, it is difficult to cause each user to determine for which user display content displayed in the display screen is intended.

If, for example, the size of the display screen is large, a user positioned at a long distance from the display screen can recognize display content, but it is difficult for a user positioned at a short distance from the display screen to recognize display content.

Thus, even if, for example, the technology described in Japanese Patent Application Laid-Open No. 2010-102235 is used, it may not be possible to cause one user or two or more users viewing images shown in the display screen to recognize that display content displayed in the display screen is intended for the user or the users.

Overview of Processing of the Display Control Method According to the Present Embodiment Thus, the display control apparatus according to the present embodiment sets display regions corresponding to users capable of viewing the display screen inside images (hereinafter, called "images to be displayed") displayed in the display screen. Then, the display control apparatus according to the present embodiment clips set display region portions from images to be displayed and causes the display screen to display images in which display content is displayed in the clipped display region portions. Hereinafter, the display region (display region corresponding to a target object described later) corresponding to a user capable of viewing the display screen according to the present embodiment will be indicated as a "clipping region" below.

Display screens caused by the display control apparatus according to the present embodiment to display images include, for example, the display screen of an external display apparatus connected to the display control apparatus according to the present embodiment via a network (or directly) and the display screen of a display unit (described later) included in the display control apparatus according to the present embodiment. Networks according to the present embodiment include, for example, a wired network such as a LAN (Local Area Network) and a WAN (Wide Area Network), a wireless network such as a wireless LAN (Wireless Local Area Network) and a wireless WAN (WWAN: Wireless Wide Area Network) via a base station, and the Internet using a communication protocol such as TCP/IP (Transmission Control Protocol/Internet Protocol).

Images to be displayed according to the present embodiment include, for example, images indicated by an image signal transmitted from an external apparatus via a network (or directly), but images to be displayed according to the present embodiment are not limited to the above example. For example, images to be displayed according to the present embodiment may be images indicated by an image signal obtained as a result of receiving (directly or indirectly via a set top box or the like) and decoding a broadcast wave transmitted from a television tower or the like by the display control apparatus according to the present embodiment. The display control apparatus according to the present embodiment can also select images indicated by an image signal obtained by decoding image data stored, for example, in a storage unit (described later) or a removable external recording medium as images to be displayed.

More specifically, the display control apparatus according to the present embodiment sets the clipping region based on images to be displayed and captured images in which the display direction of the display screen is imaged (clipping region setting processing). The display control apparatus according to the present embodiment also sets display content to be displayed in the set clipping region (display content setting processing). Then, the display control apparatus according to the present embodiment causes the display screen to display images in which the set display content is displayed in the set clipping region (display control processing).

The captured image according to the present embodiment is, as described above, an image in which the display direction of the display screen is imaged. If the display screen caused by the display control apparatus according to the present embodiment to display images is the display screen of an external display apparatus, for example, images are captured by an imaging device included in the external display apparatus or an imaging apparatus connected to the external display apparatus. Then, the display control apparatus according to the present embodiment acquires a captured image by receiving an image signal indicating the captured image transmitted from the external display apparatus or the imaging apparatus. If the display screen caused by the display control apparatus according to the present embodiment to display images is the display screen is the display screen of a display unit (described later), for example, images are captured by an imaging unit (described later) included in the display control apparatus according to the present embodiment or an imaging apparatus connected to the display control apparatus according to the present embodiment. Then, the display control apparatus according to the present embodiment acquires a captured image by capturing the image by the imaging unit (described later) or receiving an image signal indicating the captured image transmitted from the imaging apparatus. The method of acquiring a captured image by the display control apparatus according to the present embodiment is naturally not limited to the above method.

Figure 1B:
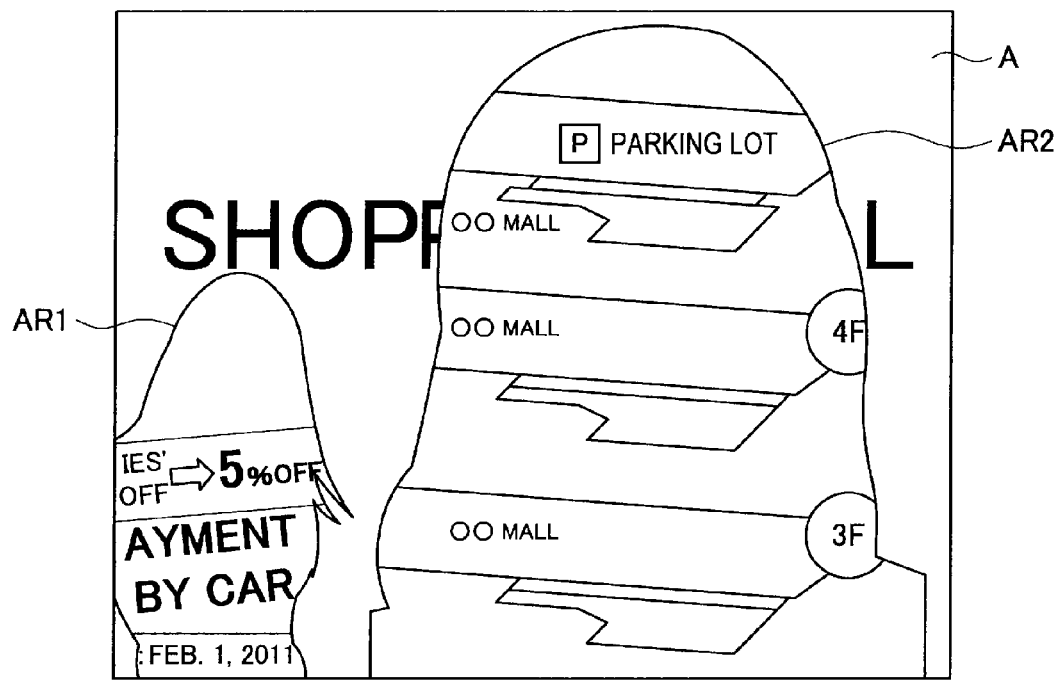
FIG. 1B is an explanatory view providing an overview of the processing of the display control method according to the present embodiment for the display control apparatus according to the present embodiment.

FIGS. 1A and 1B are explanatory views providing an overview of processing of a display control method according to the present embodiment for a display control apparatus according to the present embodiment. "A" shown in FIGS. 1A and 1B indicates an example of images to be displayed. "B" and "C" shown in FIG. 1A indicate objects (hereinafter, called "target objects") to be detected that are detected from the captured images. FIG. 1A shows an example in which users (humans) are target objects and shows a case when two users are contained in the captured image. "AR1" shown in FIG. 1B indicates a clipping region corresponding to "A" shown in FIG. 1A and "AR2" shown in FIG. 1B indicates a clipping region corresponding to "B" shown in FIG. 1A.

The display control apparatus according to the present embodiment detects a target object from, for example, a captured image. The display control apparatus according to the present embodiment detects a user (an example of target objects) from a captured image by performing processing, for example, face detection processing or edge detection processing on the captured image. However, the method of detecting a target object by the display control apparatus according to the present embodiment is not limited to the above method. For example, when a target object is detected by an external apparatus, the display control apparatus according to the present embodiment can also detect a target object from a captured image without performing processing such as the face detection processing by using a detection result transmitted from the external apparatus.

Target objects detected by the display control apparatus according to the present embodiment from a captured image are not limited to, as shown in FIG. 1A, users. For example, the display control apparatus according to the present embodiment can detect any object such as a car and shoe as a target object from a captured image by using any kind of object detection processing. A case when the display control apparatus according to the present embodiment selects users as target objects will mainly be taken as an example below.

If a target object is detected from the captured image, the display control apparatus according to the present embodiment identifies a region occupied by an image corresponding to a target object in an image to be displayed. Then, the display control apparatus according to the present embodiment sets identified regions as clipping regions "AR1", "AR2".

The display control apparatus according to the present embodiment sets, for example, a region occupied by an image corresponding to a target object in an image to be displayed when the image to be displayed and a captured image are synthesized as a clipping region, but the setting method of a clipping region is not limited to the above method. For example, the display control apparatus according to the present embodiment can also set a clipping region by using information about a target object such as distance information indicating the distance between the display screen and the target object. When distance information is used, the display control apparatus according to the present embodiment sets a clipping region of the size in accordance with the distance indicated by the distance information. The display control apparatus according to the present embodiment acquires information about the target object from, for example, various detection sensors such as a distance sensor and infrared sensor included in an external display apparatus, various detection sensors connected to the external display apparatus, or various detected sensors connected to the detection unit (described later) included in the display control apparatus according to the present embodiment or the display control apparatus.

The display control apparatus according to the present embodiment may set a clipping region based on, for example, the number of detected target objects. Hereinafter, for example, information about target objects contained in a captured image such as information obtained by processing the captured image such as the shape, attributes, and number of target objects and information obtained by a detection sensor such as distance information may generically be called "target object information".

Incidentally, the display control apparatus according to the present embodiment can identify a region occupied by an image corresponding to a target object in an image to be displayed without synthesizing, for example, as shown in FIG. 1A, the image to be displayed and images corresponding to the target objects detected from the captured image. Thus, the display control apparatus according to the present embodiment may not synthesize images as shown, for example, in FIG. 1A.

If the clipping regions "AR1", "AR2" are set, the display control apparatus according to the present embodiment causes the display screen to display, for example, as shown in FIG. 1B, an image (an example of images in which display content set to within a clipping region) obtained by synthesizing images corresponding to display content set to the set clipping regions "AR1", "AR2".

FIG. 1B shows an example in which the display control apparatus according to the present embodiment causes the clipping region "AR1" to display an advertisement and the clipping region "AR2" to display a compound map of a shopping mall. However, display content a clipping region is caused to display by the display control apparatus according to the present embodiment is not limited to advertisements or compound maps as shown in FIG. 1B. For example, the display control apparatus according to the present embodiment may also set content of history information such as remarks history and purchase history of a user (an example of target objects) as display content a clipping region is caused to display. If the display control apparatus according to the present embodiment is applied to a video conference system, the display control apparatus according to the present embodiment can cause a clipping region to display material of participants (an example of users) or conversation content.

The display control apparatus according to the present embodiment sets content such as history information corresponding to an identified user by identifying the user as a target object by using any kind of authentication technology such as face authentication as display content a clipping region is caused to display. The display control apparatus according to the present embodiment acquires history information of the identified user or the like from, for example, an external apparatus such as a server or the storage unit (described later) included in the display control apparatus according to the present embodiment, but the method of acquiring history information and the like by the display control apparatus according to the present embodiment is not limited to the above method. As described above, the display control apparatus according to the present embodiment can detect any object from a captured image as a target object. Thus, the display control apparatus according to the present embodiment can set content of information about each of detected target objects by identifying the target objects detected by using any kind of identification technology as display content the corresponding clipping region is caused to display.

Further, the display control apparatus according to the present embodiment can also change display content based on attributes (for example, male or female, an age group or the like if users are target objects) of a detected target object, the size (for example, an area S described later and corresponding to a detected target object) of a detected target object or the like. Attributes of a target object can be determined by any kind of image processing technology, for example, image processing that detects characteristic points from an image and determines attributes based on detected characteristic points. If display content is changed based on attributes of a target object, a display control apparatus 100 sets display content by using, for example, a determination result of attributes and a table associating attributes and data corresponding to display content. An example of processing to change display content based on the size of a detected target object will be described later.

FIG. 1B shows an example in which the display control apparatus according to the present embodiment sets content of different information to the clipping regions "AR1", "AR2" corresponding to the two detected target objects, but the display content the display control apparatus according to the present embodiment causes a clipping region to display is not limited to the above example. For example, the display control apparatus according to the present embodiment can set the same content as the display content respective clipping regions corresponding to a plurality of target objects are caused to display. The above same content may be, for example, prescribed content or set by overall evaluation of attributes of each of a plurality of target objects detected from the captured image by using statistical techniques such as averaging.

FIG. 1B shows an example in which the display control apparatus according to the present embodiment causes the clipping regions "AR1", "AR2" to display a portion of display content, but the display content the display control apparatus according to the present embodiment causes a clipping region to display is not limited to the above example. For example, the display control apparatus according to the present embodiment may cause a clipping region to display the whole display content set to the set clipping region. In the example shown in FIG. 1B, with the movement of the users (target objects), other portions of the set display content will be displayed.

The display control apparatus according to the present embodiment causes the display screen to display, for example, as shown in FIG. 1B, an image in which display content set to clipping regions corresponding to target objects detected from the captured image is displayed. With, for example, as shown in FIG. 1B, images in which display content is displayed in each of the clipping regions "AR1", "AR2" corresponding to detected target objects being displayed in the display screen, for example, the user corresponding to "B" shown in FIG. 1A can recognize that content displayed in the clipping region "AR1" is intended for the user. Similarly, the user corresponding to "C" shown in FIG. 1A can recognize that content displayed in the clipping region "AR2" is intended for the user.

Therefore, the display control apparatus according to the present embodiment can cause users viewing images shown in the display screen to recognize that display content is intended for the respective users by performing, for example, (1) clipping region setting processing, (2) display content setting processing, and (3) display control processing.

Concrete Example of the Display Control Method According to the Present Embodiment Next, processing of the display control method according to the present embodiment will be described more specifically. It is assumed below that the display control apparatus (hereinafter, sometimes called the "display control apparatus 100") according to the present embodiment performs processing of the display control method according to the present embodiment.

Figure 2:
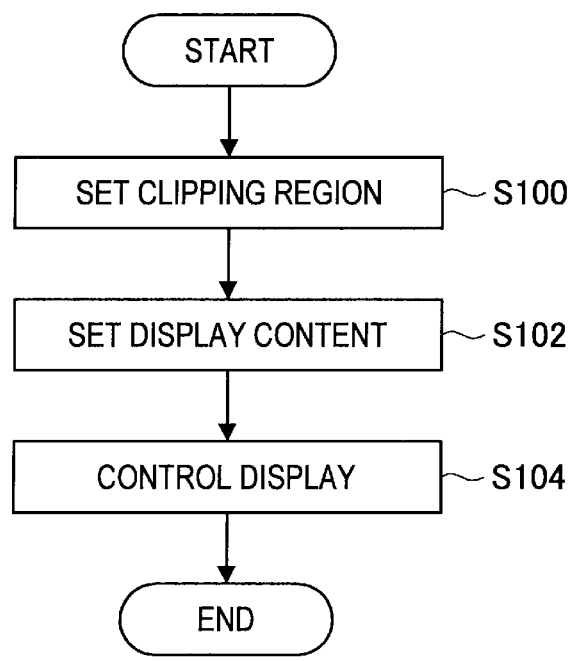
FIG. 2 is a flow chart exemplifying the processing by the display control apparatus according to the present embodiment.

FIG. 2 is a flow chart exemplifying the processing by the display control apparatus 100 according to the present embodiment. FIG. 2 shows a general framework of processing by the display control apparatus 100. A concrete example of processing shown in FIG. 2 will be described later.

The display control apparatus 100 sets clipping regions to an image to be displayed (S100, clipping region setting processing). The display control apparatus 100 sets clipping regions based on the image to be displayed and captured image. More specifically, the display control apparatus 100 sets clipping regions by using, for example, information obtained by processing the captured image or information about target objects obtained by various sensors. A concrete example of processing to set clipping regions by the display control apparatus 100 according to the present embodiment will be described later.

After the clipping regions are set in step S100, the display control apparatus 100 sets display content displayed in each of the set clipping regions (S102, display content setting processing). The display control apparatus 100 may set, for example, prescribed display content or display content corresponding to attributes of the target object or an identification result of the target object. If a plurality of clipping regions is set, the display control apparatus 100 may set, for example, the same display content or different display content to each of the set clipping regions.

After the display content is set in step S102, the display control apparatus 100 causes the display screen to display images in which display content set in step S102 is displayed in the clipping regions set in step S100 (S104, display control processing). When the display control apparatus 100 causes the display screen of an external display apparatus to display the images, the display control apparatus 100 causes the display screen thereof to display the images by transmitting an image signal showing the images to the external display apparatus. When the display control apparatus 100 causes the display screen of the display unit (described later) to display the images, the display control apparatus 100 causes the display screen thereof to display the images by transmitting an image signal showing the images to the display unit (described later).

The display control apparatus 100 realizes the processing (clipping region setting processing) of (1) to the processing (display control processing) of (3) of the display control method according to the present embodiment by performing, for example, the processing shown in FIG. 2 to cause the display screen to display images in which display content set to clipping regions corresponding to target objects detected from the captured image.

Thus, the display control apparatus 100 can cause users viewing images shown in the display screen to recognize that display content displayed in the display screen is intended for the respective users by performing, for example, the processing shown in FIG. 2. The processing of the display control method according to the present embodiment as shown, for example, in FIG. 2 is not a kind of processing that will not be performed again after being performed once and the display control apparatus 100 repeats the processing of the display control method according to the present embodiment periodically or non-periodically. That is, the display control apparatus 100 can perform processing in real time (or almost in real time). Therefore, the display control apparatus 100 can change display content displayed in the set clipping regions in real time (or almost in real time).

The processing of the display control method according to the present embodiment shown in FIG. 2 will be described more specifically.

[1] First Example

Figure 3:
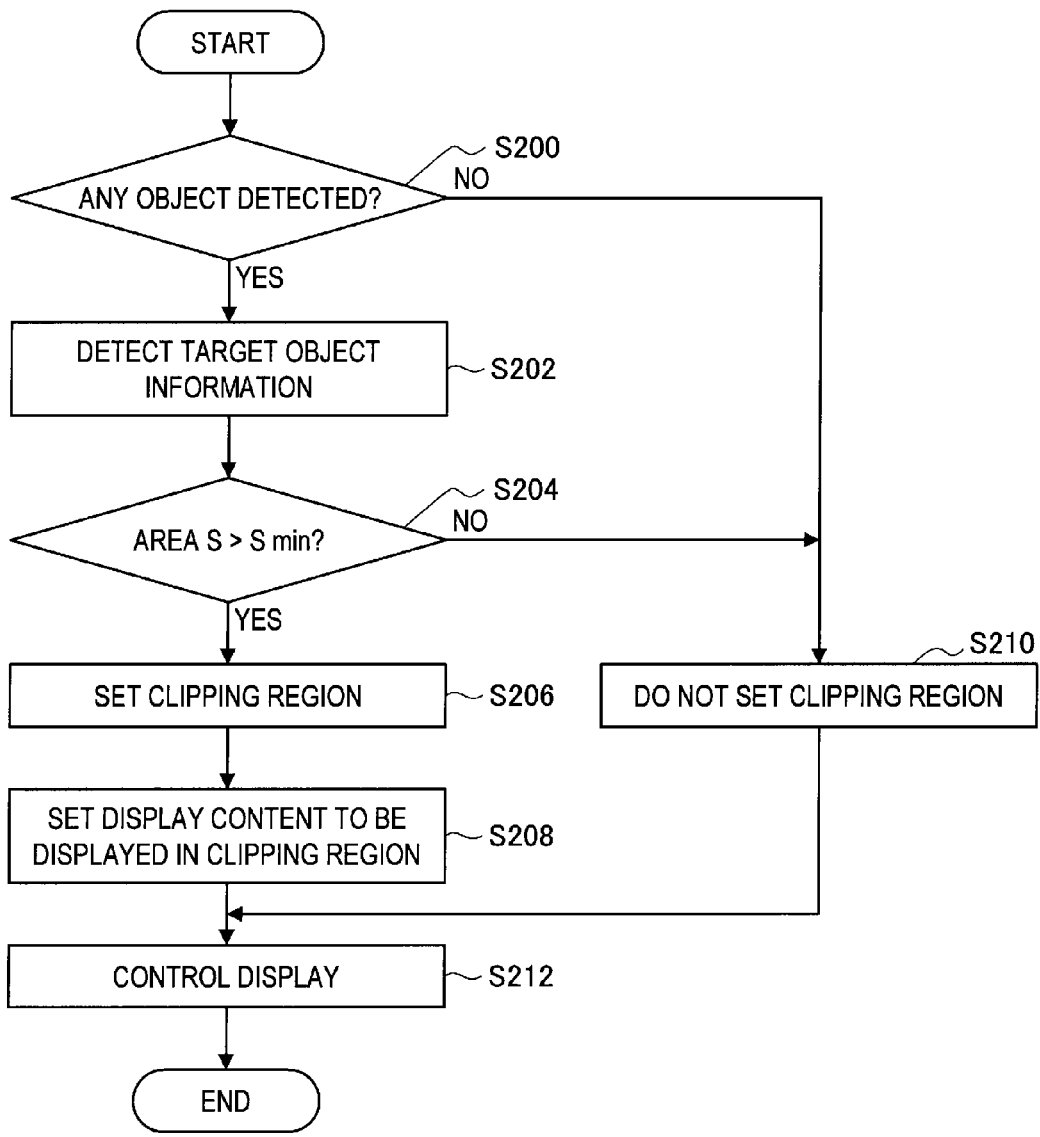
FIG. 3 is a flow chart showing a first example of the processing of the display control method according to the present embodiment for the display control apparatus according to the present embodiment.

FIG. 3 is a flow chart showing the first example of the processing of the display control method according to the present embodiment for the display control apparatus 100 according to the present embodiment.

The display control apparatus 100 determines whether any target object is detected (S200). The display control apparatus 100 makes a determination in step S200 by detecting target objects from a captured image by making an image analysis of the captured image by hardware and/or software, but the processing performed by the display control apparatus 100 according to the present embodiment is not limited to the above example. When, for example, target objects are detected by an external detection apparatus like an object detection sensor connected to the external detection apparatus or an object detection sensor connected to the display control apparatus 100, the display control apparatus 100 can also make a determination in step S200 based on a detection result transmitted from the external detection apparatus.

If not determined in step S200 that a target object is detected, the display control apparatus 100 does not set any clipping region (S210). Then, the display control apparatus 100 performs processing in step S212 described later.

If determined in step S200 that a target object is detected, the display control apparatus 100 detects target object information (S202). The display control apparatus 100 detects target object information by processing the captured image or using information showing a detection result detected by an external detection sensor or the detection unit (described later). Target object information according to the first example of processing of the display control method according to the present embodiment includes, for example, the shape of a target object, attributes of a target object, and information indicating the distance between the display screen and a target object.

After the processing in step S202 being performed, the display control apparatus 100 compares an area S corresponding to the detected target object (size of the detected target object) and an area Smin of the setting reference region (size of a setting reference region) serving as the reference to set a clipping region. Then, the display control apparatus 100 determines whether the area S is larger than the area Smin (S204). The area Smin of the setting reference region according to the present embodiment may be, for example, a prescribed fixed value or a variable value that can be changed by the user of the display control apparatus 100.

FIG. 3 shows a case when the display control apparatus 100 determines whether the area S is larger than the area Smin in step S204, but the processing in step S204 is not limited to the above processing. For example, the display control apparatus 100 according to the present embodiment may determine whether the area S is equal to the area Smin or larger in step S204 (this also applies below).

The display control apparatus 100 sets the area of a whole figure of the target object detected in step S202 as the area S, but the processing by the display control apparatus 100 according to the present embodiment is not limited to the above processing. If, for example, target objects are users, the display control apparatus 100 can also set a portion of the area of an embodiment object such as the area of a user's face as the area corresponding to the detected target object according to the present embodiment. As described above, however, target objects according to the present embodiment are not limited to users. That is, even if target objects are shoes or cars, the display control apparatus 100 can set a portion or the whole of the area of a target object as the area corresponding to the detected target object according to the present embodiment.

If not determined in step S204 that the area S is larger than the area Smin, the display control apparatus 100 does not set any clipping region (S210). Then, the display control apparatus 100 performs processing in step S212 described later.

In determined in step S204 that the area S is larger than the area Smin, the display control apparatus 100 sets a portion or the whole of the target object as a clipping region (S206).

After the processing in step S206 being performed, the display control apparatus 100 sets display content to be displayed in the clipping region set in step S206 (S208). The display control apparatus 100 may set, for example, prescribed display content or display content corresponding to attributes of the target object or an identification result of the target object by using, for example, target object information detected in step S202. If a plurality of clipping regions is set, the display control apparatus 100 may set, for example, the same display content or different display content to each of the set clipping regions.

After the processing in step S208 and/or step S210 being performed, the display control apparatus 100 controls the display of images in the display screen (S212). If, for example, no target object is contained in the captured image or a clipping region is set to none of detected target objects, the display control apparatus 100 causes the display screen to display images to be displayed as they are (normal display). If a clipping region is set to one of detected target objects, the display control apparatus 100 causes the display screen to display images in which the display content set in step S208 is displayed in the clipping region set in step S206.

The display control apparatus 100 causes the display screen to display images in which display content set to clipping regions corresponding to target objects detected from a captured image by performing, for example, the processing shown in FIG. 3. In the processing shown in FIG. 3, for example, the processing of steps S200 to S206 and S210 corresponds to the processing (clipping region setting processing) of (1) and the processing in step S208 corresponds to the processing (display content setting processing) of (2). Then, the processing in step S212 corresponds to the processing (display control processing) of (3).

Therefore, the display control apparatus 100 can cause users viewing images shown in the display screen to recognize that display content displayed in the display screen is intended for the respective users by performing, for example, the processing shown in FIG. 3.

FIG. 3 shows an example in which the display control apparatus 100 selectively sets a clipping region based on a comparison result of the area S corresponding to the detected target object (size of the detected target object) and the area Smin of the setting reference region (size of the setting reference region), but the processing according to the first example of the display control method according to the present embodiment for the display control apparatus 100 according to the present embodiment is not limited to the processing shown in FIG. 3. For example, in step S204, the display control apparatus 100 may selectively set a clipping region based on a determination result whether a number Hn of target objects whose distance from the display screen is smaller than a predetermined reference distance (or the number of target objects whose distance from the display screen is equal to or less than the predetermined reference distance) is larger than a setting reference number Hn_max of clipping regions based on distance information as target object information and the number of target objects. In the above case, if, for example, the number Hn of target objects is larger than the setting reference number Hn_max of clipping regions (or if the number Hn of target objects is equal to or more than the setting reference number Hn_max), the display control apparatus 100 sets a clipping region. The setting reference number Hn_max according to the present embodiment may be, for example, a prescribed fixed value or a variable value that can be changed by the user of the display control apparatus 100.

[2] Second Example

The size of a clipping region set by the display control apparatus 100 changes in accordance with, for example, the distance between a target object and the display screen such as the size of a clipping region being increased with a decreasing distance between a target object and the display screen. If, for example, as indicated by the clipping regions "AR1", "AR2" in FIG. 1B, clipping regions have different sizes, the information amount of information the user can be caused to recognize increases with an increasing size of the clipping region. Thus, the display control apparatus 100 performs, for example, processing to change information a clipping region is caused to display based on the size of the clipping region as processing according to a second example of the display control method according to the present embodiment.

More specifically, while the display control apparatus 100 basically performs processing similar to the processing shown in FIG. 3, the display control apparatus 100 performs one of processing of (a) to (c) below based on the area S corresponding to the detected target object (size of the detected target object), the area Smin of the setting reference region (size of a setting reference region), and an area Schange of a reference region serving as the reference to switch display content for each target object. If no target object is detected from a captured image, as indicated by step S200 and step S210 in FIG. 3, the display control apparatus 100 sets no clipping region.

The area Schange of the reference region serving as the reference to switch display content according to the present embodiment may be, for example, a prescribed fixed value or a variable value that can be changed by the user of the display control apparatus 100.

If the size of a clipping region increases with a decreasing distance between a target object and the display screen, the area Smin of the setting reference region corresponds to a threshold to determine that the distance between the target object and the display screen is large. If the size of a clipping region increases with a decreasing distance between a target object and the display screen, the area Schange of the reference region serving as the reference to switch display content corresponds to a threshold to determine that the distance between the target object and the display screen is small.

(a) Processing when S<Smin (or processing when S≤Smin)

The display control apparatus 100 sets, as indicated by step S204 and step S210 in FIG. 3, no clipping region.

(b) Processing when Smin≤S≤Schange (or processing when Smin<S<Schange)

The display control apparatus 100 sets, as indicated by step S204 and step S206 in FIG. 3, a clipping region. Then, the display control apparatus 100 sets display content displayed when the set clipping region is not determined to be large. The display control apparatus 100 may set, for example, display content in accordance with attributes of a target object by further using target object information.

(c) Processing when S>Schange (or processing when S≥Schange)

The display control apparatus 100 sets, as indicated by step S204 and step S206 in FIG. 3, a clipping region. Then, the display control apparatus 100 sets display content displayed when the set clipping region is determined to be large. The display control apparatus 100 may set, for example, display content in accordance with attributes of a target object by further using target object information.

While the display control apparatus 100 basically performs processing similar to the processing shown in FIG. 3, the display control apparatus 100 performs one of the processing of (a) to the processing of (c) as the processing (clipping region setting processing) of (1) and the processing (display content setting processing) of (2). The display control apparatus 100 controls, similarly to the processing shown in FIG. 3, the display of images in the display screen.

Therefore, the display control apparatus 100 can cause users viewing images shown in the display screen to recognize that display content displayed in the display screen is intended for the respective users by performing the processing according to the second example of the display control method according to the present embodiment.

The processing according to the second example of the display control method according to the present embodiment for the display control apparatus 100 according to the present embodiment is not limited to the above processing. For example, the display control apparatus 100 can switch display content in multiple steps by setting a plurality of the areas Schange of the reference region as the reference to switch the display content.

[3] Third Example

In the processing according to the first example and the processing according to the second example of the display control method according to the present embodiment, an example of processing to set a switching region based on the area corresponding to the detected target object (size of the detected target object) is shown. However, the processing of the display control method according to the present embodiment is not limited to the above processing. If, for example, a target object moves greatly, even if a clipping region is set and display content is set to the clipping region, the relevant user may not be viewing the display content. Thus, as processing of the third example of the display control method according to the present embodiment, an example of processing to selectively set the switching region will be described next.

Figure 4:
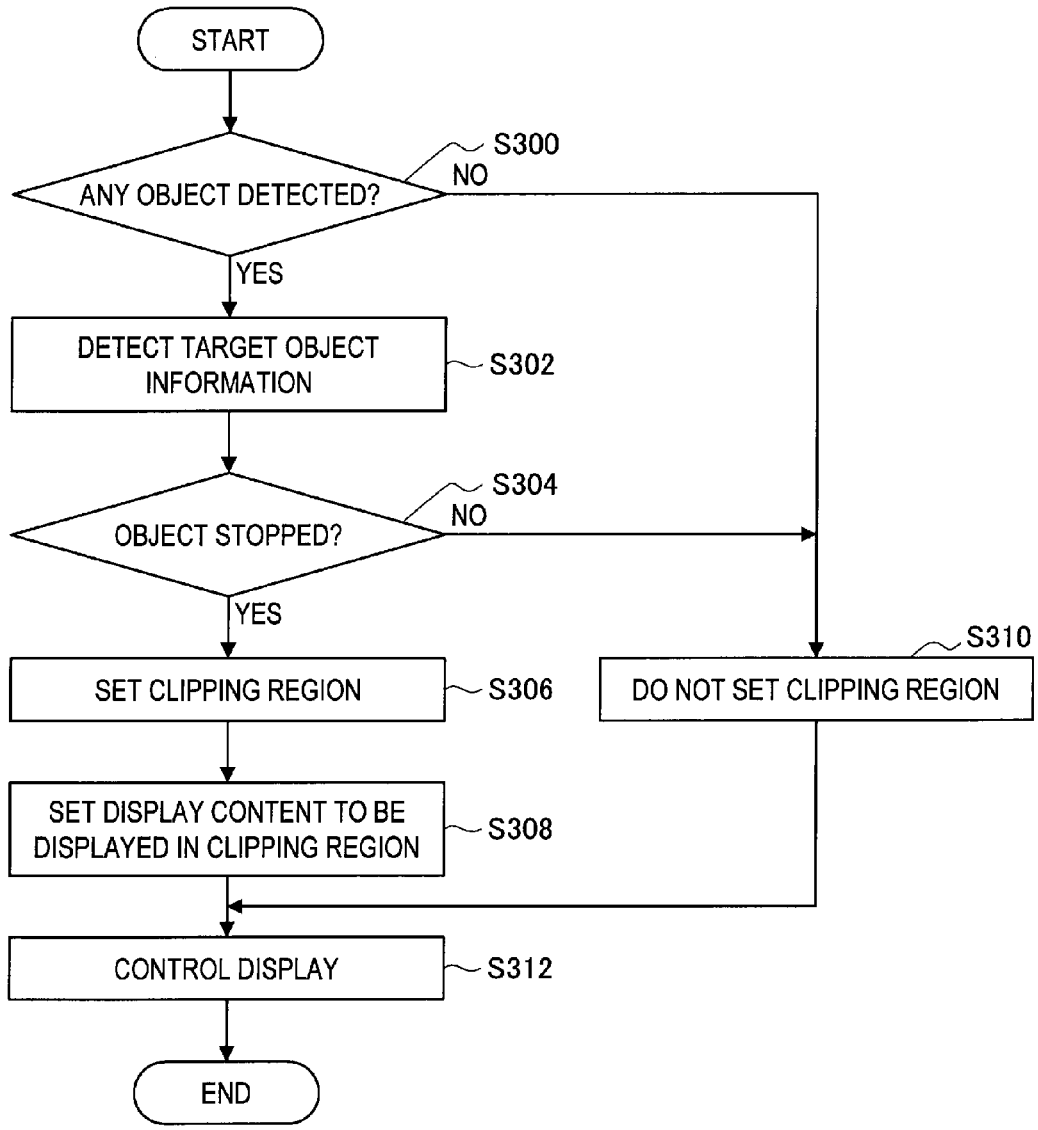
FIG. 4 is a flow chart showing a third example of the processing of the display control method according to the present embodiment for the display control apparatus according to the present embodiment.

FIG. 4 is a flow chart showing the third example of the processing of the display control method according to the present embodiment for the display control apparatus 100 according to the present embodiment.

The display control apparatus 100 determines, like step S200 in FIG. 3, whether any target object is detected (S300).

If not determined in step S300 that a target object is detected, the display control apparatus 100 does not set any clipping region (S310). Then, the display control apparatus 100 performs processing in step S312 described later.

If determined in step S300 that a target object is detected, the display control apparatus 100 detects, like step S202 in FIG. 3, target object information (S302). The target object information according to the third example of processing of the display control method according to the present embodiment includes, for example, the shape of a target object, attributes of a target object, and information indicating the distance between the display screen and a target object.

After the processing in step S302 being performed, the display control apparatus 100 compares the amount of movement of the detected target object and the reference amount of movement serving as the reference to determine whether a target object is moving. Then, the display control apparatus 100 determines whether the target object is stopped based on the comparison result of the amount of movement of the target object and the reference amount of movement (S304). More specifically, if, for example, the amount of movement of the target object is smaller than the reference amount of movement (or the amount of movement of the target object is equal to or less than the reference amount of movement and this also applies below), the display control apparatus 100 determines that the target object is stopped. The reference amount of movement according to the present embodiment may be, for example, a prescribed fixed value or a variable value that can be changed by the user of the display control apparatus 100.

The amount of movement of a target object according to the present embodiment is calculated based on, for example, a plurality of frames (frame images) that are temporally continuous. The amount of movement of a target object according to the present embodiment is calculated by the display control apparatus 100 based on a captured image, but the amount of movement of a target object used by the display control apparatus 100 for processing is not limited to the above amount. For example, the display control apparatus 100 can also acquire information indicating the amount of movement of a target object calculated by an external apparatus to perform the processing in step S302 by using the acquired amount of movement.

If not determined in step S304 that the target object is stopped, the display control apparatus 100 does not set any clipping region (S310). Then, the display control apparatus 100 performs processing in step S312 described later.

If determined in step S304 that the target object is stopped, the display control apparatus 100 sets, like step S206 in FIG. 3, a portion or the whole of the target object as a clipping region (S306).

After the processing in step S306 being performed, the display control apparatus 100 sets, like step S208 in FIG. 3, display content to be displayed in the clipping region set in step S306 (S308).

After the processing in step S308 and/or step S310 being performed, the display control apparatus 100 controls, like step S212 in FIG. 3, the display of images in the display screen (S312).

Figure 5A:
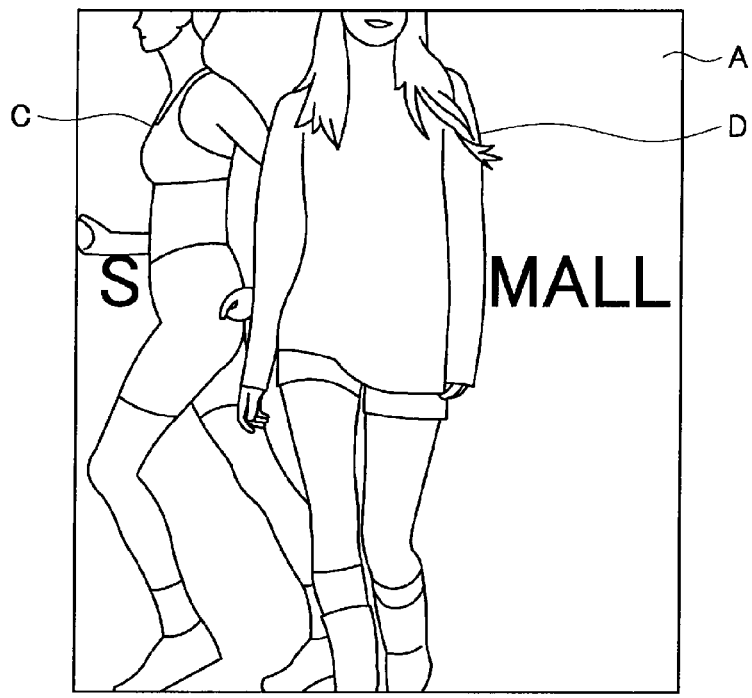
FIG. 5A is an explanatory view exemplifying a result of the processing according to the third example of the display control method according to the present embodiment for the display control apparatus according to the present embodiment.
Figure 5B:
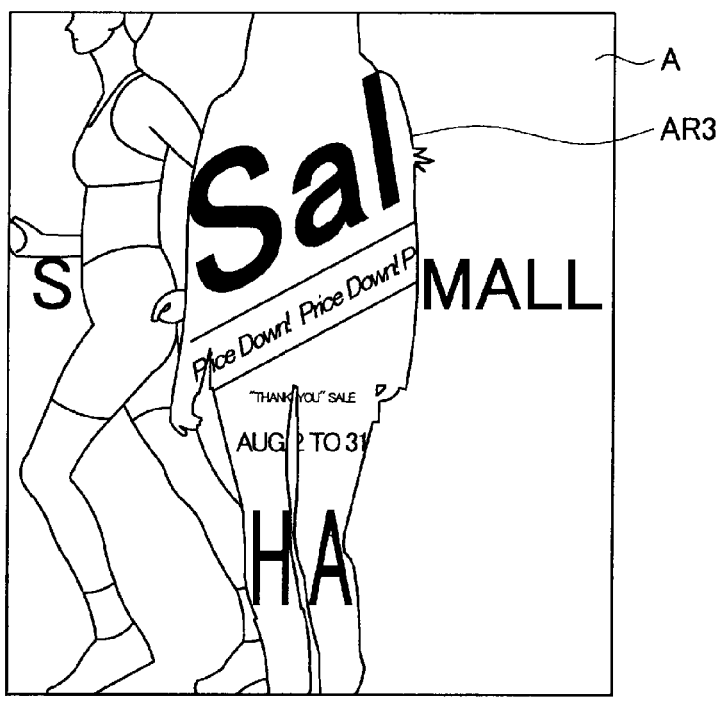
FIG. 5B is an explanatory view exemplifying the result of the processing according to the third example of the display control method according to the present embodiment for the display control apparatus according to the present embodiment.

FIGS. 5A and 5B are explanatory views exemplifying a result of the processing according to the third example of the display control method according to the present embodiment for the display control apparatus 100 according to the present embodiment. "A" shown in FIGS. 5A and 5B indicates an example of images to be displayed. "C" and "D" shown in FIG. 5A indicate target objects. FIG. 5A shows an example in which users are target objects. FIG. 5A shows an example in which a user corresponding to "C" shown in FIG. 5A is running in front of and across the display screen and a user corresponding to "D" shown in FIG. 5A stands in front of the display screen. "AR3" shown in FIG. 5B indicates a clipping region corresponding to "D" shown in FIG. 5A.

In the example shown in FIG. 5A, the display control apparatus 100 does not determine in step S304 that the user (an example of target objects) indicated by "C" in FIG. 5A is stopped and thus does not set a clipping region corresponding to the user indicated by "C" in FIG. 5A. In addition, the display control apparatus 100 determines in step S304 that the user (an example of target objects) indicated by "D" in FIG. 5A is stopped and thus sets a clipping region corresponding to the user indicated by "D" in FIG. 5A. Thus, as shown in FIG. 5B, even if a plurality of target objects is present, the display control apparatus 100 can cause the display screen to display images in which a clipping region is selectively set to a specific target object determined to be stopped.

The display control apparatus 100 causes the display screen to display images in which display content set to clipping regions corresponding to target objects detected from a captured image by performing, for example, the processing shown in FIG. 4. In the processing shown in FIG. 4, for example, the processing of steps S300 to S306 and S310 corresponds to the processing (clipping region setting processing) of (1) and the processing in step S308 corresponds to the processing (display content setting processing) of (2). Then, the processing in step S312 corresponds to the processing (display control processing) of (3).

Therefore, the display control apparatus 100 can cause users viewing images shown in the display screen to recognize that display content displayed in the display screen is intended for the respective users by performing, for example, the processing shown in FIG. 4.

Also by performing the processing shown in FIG. 4, when, for example, a target object is moving, images to be displayed in which no clipping region is set are displayed (normal display) and when the target object is determined to stand, the display screen can be caused to display display content set to a clipping region corresponding to the target object. If, for example, the display screen whose display is controlled by the display control apparatus 100 is the display screen of a display apparatus installed on a roadside and target objects are cars, for example, a use case shown below can be realized:

When a car is moving, no clipping display of the car is made, but when the car is stopped, a dedicated display region (clipping region) clipped in the shape of the car appears when the car is stopped to display a dedicated advertisement in the display region.

The processing according to the third example of the display control method according to the present embodiment for the display control apparatus 100 according to the present embodiment is not limited to the above processing. For example, the display control apparatus 100 can also perform processing combining the processing according to the third example of the display control method according to the present embodiment shown in FIG. 4 and the processing (including modifications thereof and this applies also below) according to the first example of the display control method according to the present embodiment or the processing (including modifications thereof and this applies also below) according to the second example.

[4] Fourth Example

The processing of the display control method according to the present embodiment is not limited to the processing according to the first example to the processing according to the third example described above. In recent years, touch screens allowing both the display and user operations are widely used. Thus, if target objects are, for example, users (humans), the display control apparatus 100 may selectively set an operation interface that can be operated by the user as display content.

Figure 6:
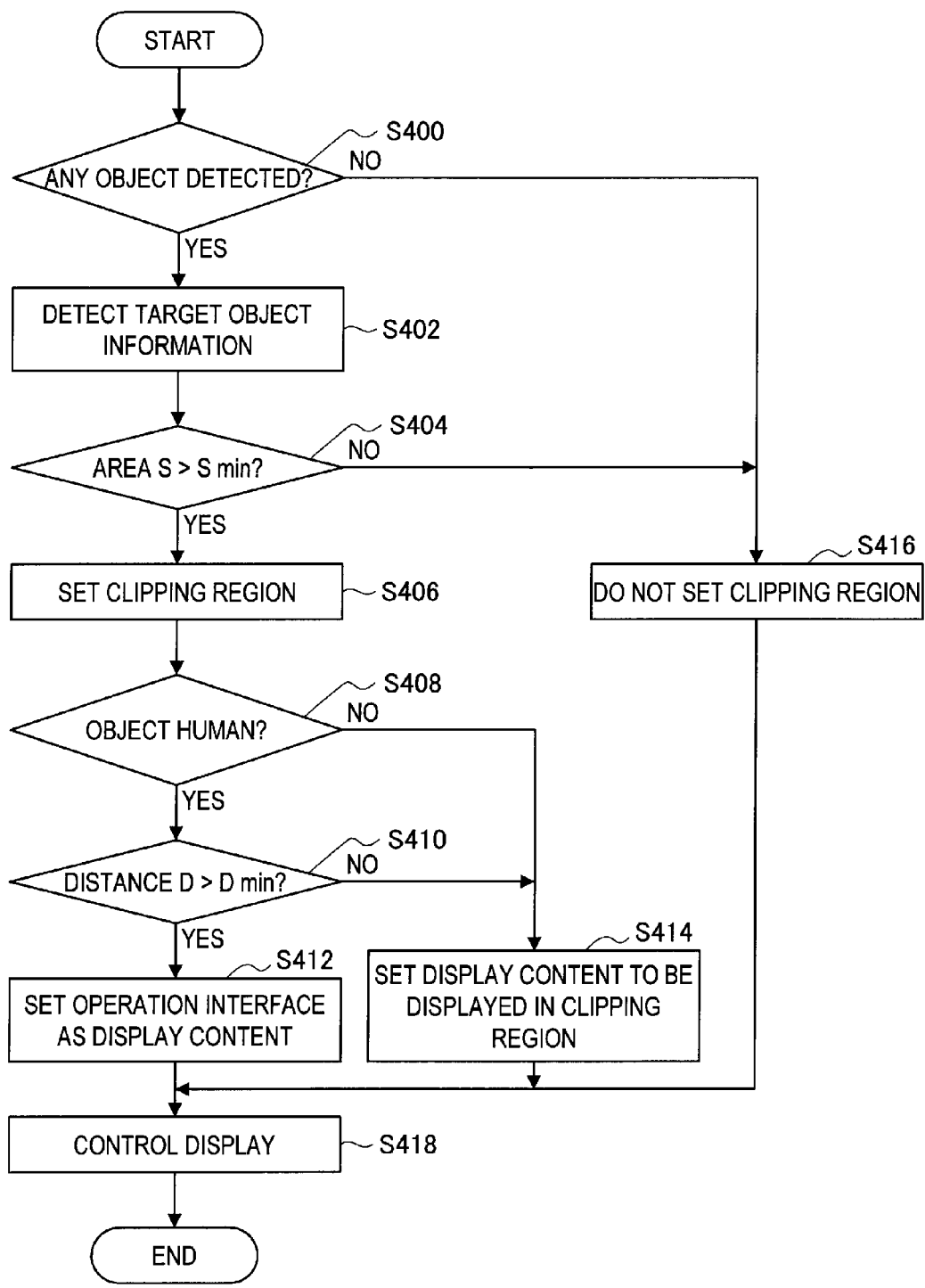
FIG. 6 is a flow chart showing a fourth example of the processing of the display control method according to the present embodiment for the display control apparatus according to the present embodiment.

FIG. 6 is a flow chart showing the fourth example of the processing of the display control method according to the present embodiment for the display control apparatus 100 according to the present embodiment.

The display control apparatus 100 determines, like step S200 in FIG. 3, whether any target object is detected (S400).

If not determined in step S400 that a target object is detected, the display control apparatus 100 does not set any clipping region (S416). Then, the display control apparatus 100 performs processing in step S418 described later.

If determined in step S400 that a target object is detected, the display control apparatus 100 detects, like step S202 in FIG. 3, target object information (S402).

After the processing in step S402 being performed, the display control apparatus 100 compares the area S corresponding to the detected target object (size of the detected target object) and the area Smin of a setting reference region (size of the setting reference region) serving as the reference to set a clipping region. Then, the display control apparatus 100 determines, like step S204 in FIG. 3, whether the area S is larger than the area Smin (S404).

If not determined in step S404 that the area S is larger than the area Smin, the display control apparatus 100 does not set any clipping region (S416). Then, the display control apparatus 100 performs processing in step S418 described later.

In determined in step S404 that the area S is larger than the area Smin, the display control apparatus 100 sets, like step S206 in FIG. 3, a portion or the whole of the target object as a clipping region (S406).

After the processing in step S406 being performed, the display control apparatus 100 determines whether target objects are humans (S408). The display control apparatus 100 performs, for example, face detection processing on target objects and performs the processing in step S408 based on a result of the face detection processing, but the processing in step S408 is not limited to the above processing. If, for example, information indicating that target objects are humans is obtained by the processing in step S400 or the processing in step S402, the display control apparatus 100 may perform the processing in step S408 using the obtained information.

If not determined in step S408 that target objects are humans, the display control apparatus 100 sets, like step S208 in FIG. 3, display content to be displayed in the clipping region set in step S406 (S414).

If determined in step S408 that target objects are humans, the display control apparatus 100 compares a distance D between the display screen and a target object and a reference distance Dmin serving as the reference to set an operation interface as display content. Then, the display control apparatus 100 determines whether the distance D is larger than the reference distance Dmin (or the distance D is equal to or more than the reference distance Dmin and this applies also below) (S410).

The display control apparatus 100 can determine the distance D by using, for example, distance information as target object information detected in step S402. However, the method of determining the distance D by the display control apparatus 100 according to the present embodiment is not limited to the above method. For example, a corresponding relation between a target object and the display screen may be present such as the size of a clipping region being increased with a decreasing distance between the target object and the display screen. Thus, the display control apparatus 100 may estimate the distance based on the area S corresponding to a detected target object to set the estimated distance as the distance D. The reference distance Dmin according to the present embodiment may be, for example, a prescribed fixed value or a variable value that can be changed by the user of the display control apparatus 100.

If not determined in step S410 that the distance D is larger than the reference distance Dmin, the display control apparatus 100 sets, like step S208 in FIG. 3, display content to be displayed in the clipping region set in step S406 (S414).

If determined in step S410 that the distance D is larger than the reference distance Dmin, the display control apparatus 100 sets an operation interface that can be set by the user as display content (S412). Operation interfaces according to the present embodiment include, for example, a software keyboard and buttons, but as shown in a use case described later, operation interfaces according to the present embodiment are not limited to the above examples. The display control apparatus 100 sets the operation interface as display content to be displayed in the clipping region set in step S406, but the processing in step S412 is not limited to the above processing. For example, the display control apparatus 100 may set the operation interface as display content to be displayed in a region other than the clipping region set in step S406.

After the processing in step S412 and/or step S414 and/or step S416 being performed, the display control apparatus 100 controls, like step S212 in FIG. 3, the display of images in the display screen (S418).

The display control apparatus 100 causes the display screen to display images in which display content set to clipping regions corresponding to target objects detected from a captured image by performing, for example, the processing shown in FIG. 6. In the processing shown in FIG. 6, for example, the processing of steps S400 to S406 and S416 corresponds to the processing (clipping region setting processing) of (1) and the processing in steps S408 to S414 corresponds to the processing (display content setting processing) of (2). Then, the processing in step S416 corresponds to the processing (display control processing) of (3).

Therefore, the display control apparatus 100 can cause users viewing images shown in the display screen to recognize that display content displayed in the display screen is intended for the respective users by performing, for example, the processing shown in FIG. 6.

If, as shown in steps S408 to S414, target objects are users (humans), the display control apparatus 100 selectively sets an operation interface as display content based on a comparison result of the distance D and the reference distance Dmin. Thus, the display control apparatus 100 can realize, for example, use cases shown below by performing, for example, the processing according to the fourth example shown in FIG. 6:

In the preceding display in a store such as a department store, information about each floor as shown, for example, in "A" of FIG. 1B is normally displayed in clipping regions, but if floor information is touched, the display is switched to information about stores in the touched position.

When a user passes near the monitor in a store, an announcement display of coupons is made in a clipping region, but when the user stops and turns his (her) face to the front of the display screen, an operation interface through which a coupon can be obtained is displayed.

The processing according to the fourth example of the display control method according to the present embodiment for the display control apparatus 100 according to the present embodiment is not limited to the above processing. For example, the display control apparatus 100 can also perform processing combining the processing according to the fourth example of the display control method according to the present embodiment shown in FIG. 6 and the processing (including modifications thereof and this also applied below) according to the first example to the processing according to the third example of the display control method according to the present embodiment.

[5] Fifth Example

The processing of the display control method according to the present embodiment is not limited to the processing according to the first example to the processing according to the fourth example described above. If, for example, a plurality of target objects is detected, the display control apparatus 100 according to the present embodiment can selectively couple regions corresponding to detected target objects to set a coupled region as a clipping region.

Figure 7:
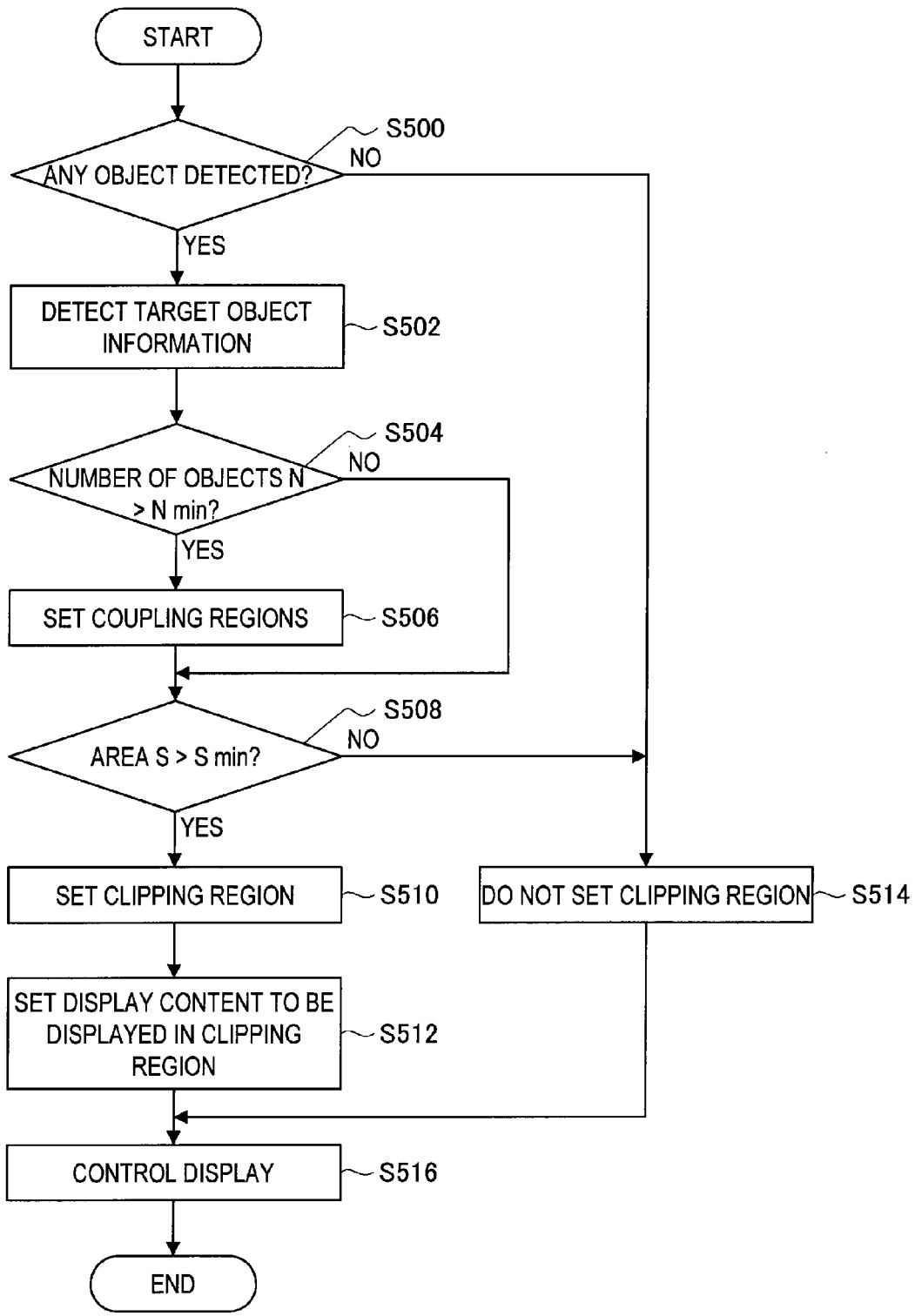
FIG. 7 is a flow chart showing a fifth example of the processing of the display control method according to the present embodiment for the display control apparatus according to the present embodiment.

FIG. 7 is a flow chart showing the fifth example of the processing of the display control method according to the present embodiment for the display control apparatus 100 according to the present embodiment.

The display control apparatus 100 determines, like step S200 in FIG. 3, whether any target object is detected (S500).

If not determined in step S500 that a target object is detected, the display control apparatus 100 does not set any clipping region (S514). Then, the display control apparatus 100 performs processing in step S516 described later.

If determined in step S500 that a target object is detected, the display control apparatus 100 detects, like step S202 in FIG. 3, target object information (S502). Target object information according to the fifth example of processing of the display control method according to the present embodiment includes, for example, the shape of a target object, attributes of a target object, and information indicating the distance between the display screen and a target object.

After the processing in step S502 being performed, the display control apparatus 100 compares a number N of detected target objects and a reference number Nmin serving as the reference to perform coupling processing. Then, the display control apparatus 100 determines whether the number N of target objects is larger than the reference number Nmin (or the number N of target objects is equal to or more than the reference number Nmin and this applies also below) (S504).

The coupling processing according to the present embodiment is processing to selectively couple regions corresponding to target objects including a region where regions corresponding to respective detected target objects overlap. The display control apparatus 100 determines the number N of target objects by using, for example, information about the number of target objects as target object information detected in step S502. The reference number Nmin according to the present embodiment may be, for example, a prescribed fixed value or a variable value that can be changed by the user of the display control apparatus 100.

If not determined in step S504 that the number N of target objects is larger than the reference number Nmin, the display control apparatus 100 performs processing in step S508 described later.

If determined in step S504 that the number N of target objects is larger than the reference number Nmin, the display control apparatus 100 sets a coupled region in which regions corresponding to target objects including overlapping regions are selectively coupled (S506).

More specifically, the display control apparatus 100 detects, for example, regions where regions corresponding to respective detected target objects overlap. The display control apparatus 100 also compares, for example, an area dS of a detected overlapping region (size of an overlapping region) and an area dSmin of a coupled reference region (size of a coupled reference region) serving as the reference to couple regions corresponding to a plurality of target objects. Then, if, for example, the area dS is larger than the area dSmin of the coupled reference region (or the area dS is equal to or more than the area dSmin of the coupled reference region) based on a comparison result, the display control apparatus 100 selectively couples regions corresponding to target objects including overlapping regions. If, for example, regions corresponding to target objects including overlapping regions are s1, . . . , sn (n is an integer equal to two or greater) and an overlapping region is ds, the display control apparatus 100 sets a region corresponding to "s1+ . . . sn−ds" as the coupled region.

Incidentally, the processing in step S506 by the display control apparatus 100 according to the present embodiment is not limited to the above processing. If, for example, when a coupled region is set as described above, a region corresponding to a target object containing no overlapping region is present, the display control apparatus 100 may set the region as a separate region or can handle the region that is not actually coupled as the same region as the set coupled region. In the above case, the display control apparatus 100 causes the display screen to display images in which display content corresponding to the coupled region is displayed in the region that is actually not coupled.

After a selective coupled region being set in steps S504, S506, the display control apparatus 100 compares, like step S204 in FIG. 3, the area S corresponding to the detected target object (size of the detected target object) and the area Smin of the setting reference region (size of the setting reference region) serving as the reference to set a clipping region. Then, the display control apparatus 100 determines whether the area S is larger than the area Smin (S508). If a coupled region is set in step S506, the display control apparatus 100 sets the area of the coupled region as the area S. If, as described above, the display control apparatus 100 handles a region that is actually not coupled as the same region as the set coupled region, the display control apparatus 100 may set, for example, the area totaling the area of the coupled region and the area of the region that is actually not coupled as the area S.

If not determined in step S508 that the area S is larger than the area Smin, the display control apparatus 100 does not set any clipping region (S514). Then, the display control apparatus 100 performs processing in step S516 described later.

In determined in step S508 that the area S is larger than the area Smin, the display control apparatus 100 sets, like step S206 in FIG. 3, a portion or the whole of the target object as a clipping region (S510).

FIG. 7 shows an example in which the display control apparatus 100 selectively sets a clipping region in accordance with a comparison result of the area S corresponding to the detected target object and the area Smin of the setting reference region, but the processing according to the fifth example of the display control method according to the present embodiment is not limited to the above processing. For example, the display control apparatus 100 may not perform the processing in step S508.

After the processing in step S510 being performed, the display control apparatus 100 sets, like step S208 in FIG. 3, display content to be displayed in the clipping region set in step S510 (S512).

After the processing in step S512 and/or step S514 being performed, the display control apparatus 100 controls, like step S212 in FIG. 3, the display of images in the display screen (S516).

Figure 8A:
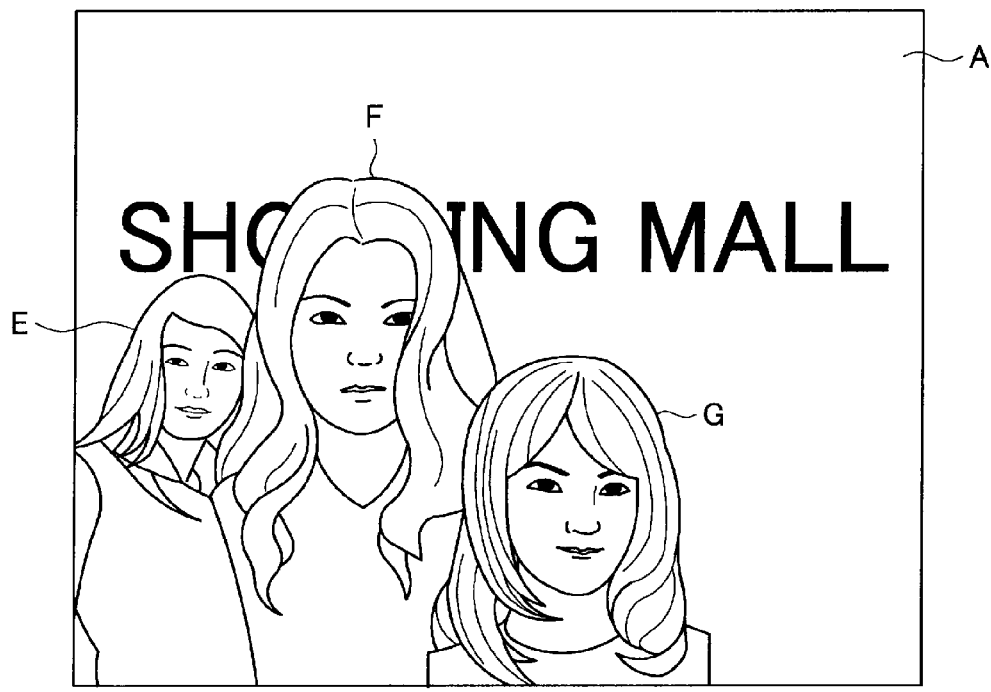
FIG. 8A is an explanatory view exemplifying a result of the processing according to the fifth example of the display control method according to the present embodiment for the display control apparatus according to the present embodiment.
Figure 8B:
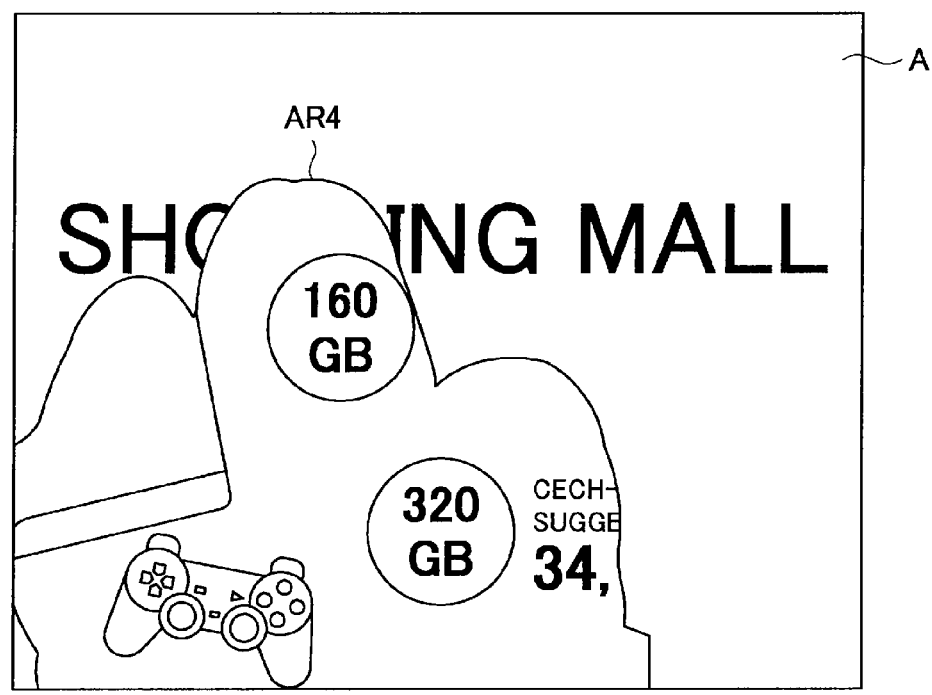
FIG. 8B is an explanatory view exemplifying the result of the processing according to the fifth example of the display control method according to the present embodiment for the display control apparatus according to the present embodiment.

FIGS. 8A and 8B are explanatory views exemplifying a result of the processing according to the fifth example of the display control method according to the present embodiment for the display control apparatus 100 according to the present embodiment. "A" shown in FIGS. 8A and 8B indicates an example of images to be displayed. "E", "F", and "G" shown in FIG. 8A indicate target objects. FIG. 8A shows an example in which users are target objects. FIG. 8A shows an example in which overlapping regions are present in regions corresponding to target objects of "E" to "G" shown in FIG. 8A. "AR4" shown in FIG. 8B indicates a clipping region corresponding to "E" to "G" shown in FIG. 8A.

If, as shown in FIG. 8A, overlapping regions corresponding to each target object are present, the display control apparatus 100 sets a coupled region in step S506. Then, if the coupled region is set, the display control apparatus 100 sets the coupled region as a clipping region in the processing of step S510. Thus, as shown in FIG. 8B, the display control apparatus 100 can cause the display screen to display images in which the display content set in step S512 is displayed in the clipping region "AR4" corresponding to the coupled region.

The display control apparatus 100 causes the display screen to display images in which display content set to clipping regions corresponding to target objects detected from a captured image by performing, for example, the processing shown in FIG. 7. In the processing shown in FIG. 7, for example, the processing of steps S500 to S510 and S514 corresponds to the processing (clipping region setting processing) of (1) and the processing in step S512 corresponds to the processing (display content setting processing) of (2). Then, the processing in step S516 corresponds to the processing (display control processing) of (3).

Therefore, the display control apparatus 100 can cause users viewing images shown in the display screen to recognize that display content displayed in the display screen is intended for the respective users by performing, for example, the processing shown in FIG. 7.

If a plurality of target objects is present, the display control apparatus 100 selectively couples the region corresponding to each target object to set the coupled region as a clipping region. Thus, the display control apparatus 100 can cause the display screen to display images in which display content is displayed in a clipping region larger than the region corresponding to each target object.

The processing according to the fifth example of the display control method according to the present embodiment for the display control apparatus 100 according to the present embodiment is not limited to the above processing. For example, the display control apparatus 100 can also perform processing combining the processing according to the fifth example of the display control method according to the present embodiment shown in FIG. 7 and the processing (including modifications thereof and this applies also below) according to the first example to the processing according to the fourth example of the display control method according to the present embodiment.

The display control apparatus 100 performs, for example, processing (including modifications thereof and this applies also below) according to the first example to the processing according to the fifth example as the processing of the display control method according to the present embodiment. It is needless to say that the processing of the display control method according to the present embodiment for the display control apparatus 100 is not limited to the processing according to the first example to the processing according to the fifth example.

Display Control Apparatus According to the Present Embodiment

Next, an example of the configuration of the display control apparatus 100 capable of performing the processing of the display control method according to the present embodiment described above will be described. A case when the display control apparatus 100 controls the display in the display screen of an external display apparatus will mainly be taken as an example below.

Figure 9:
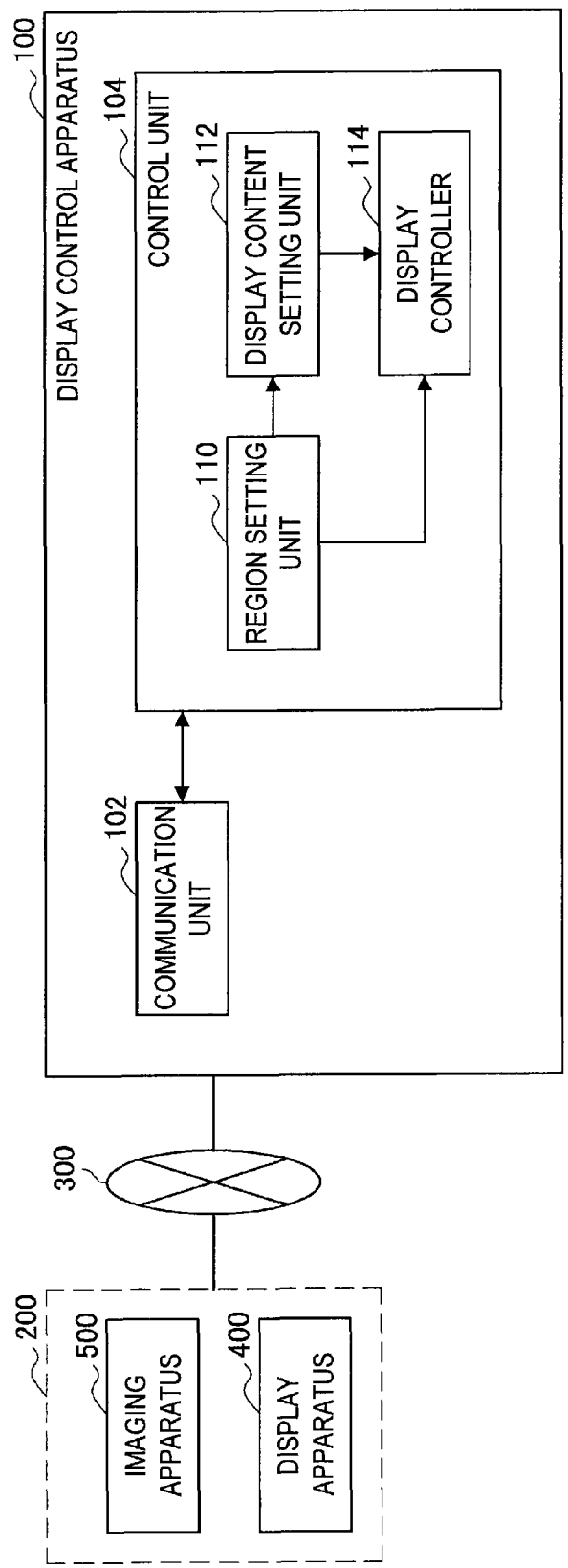
FIG. 9 is a block diagram exemplifying a configuration of the display control apparatus according to the present embodiment.

FIG. 9 is a block diagram exemplifying the configuration of the display control apparatus 100 according to the present embodiment. In FIG. 9, a display system 200 connected by a network 300 is together shown. As the network 300, for example, a wired network such as a LAN and a WAN, a wireless network such as a wireless LAN and a wireless WAN via a base station, and the Internet using a communication protocol such as TCP/IP can be cited.

The display system 200 includes, for example, a display apparatus 400 that makes a display and an imaging apparatus 500 that captures an image to display images in a display screen and to image the display screen in the display direction. Incidentally, the configuration of the display system 200 according to the present embodiment is not limited to the configuration shown in FIG. 9. For example, the display system 200 may be an apparatus in which the display apparatus 400 and the imaging apparatus 500 are integrated (for example, a display apparatus having an imaging function). The display system 200 may also include various detection sensors such as a distance sensor, an infrared sensor, and an object detection sensor. The display apparatus 400 may be configured by a device allowing both the display and user operations like, for example, a touch screen.

In FIG. 9, one unit of the display apparatus 400 configuring the display system 200 is shown as a target whose display is controlled by the display control apparatus 100, but the target whose display is controlled by the display control apparatus 100 is not limited to the above target. For example, the display control apparatus 100 can control the display in the display screen of each of a plurality of external display apparatuses connected via the network 300 (or directly).

Reference to FIG. 9 shows that the display control apparatus 100 includes a communication unit 102 and a control unit 104.

The display control apparatus 100 may also include, for example, ROM (Read Only Memory; not shown), RAM (Random Access Memory; not shown), a storage unit (not shown), an operation unit (not shown) that can be operated by the user, and a display unit (not shown) that displays various screens in the display screen. The display control apparatus 100 connects each of the above structural elements by, for example, a bus as a transmission path of data.

The ROM (not shown) stores programs and control data such as arithmetic parameters used by the control unit 104. The RAM (not shown) temporarily stores programs executed by the control unit 104 and the like.

The storage unit (not shown) is a storage function included in the display control apparatus 100 and stores various kinds of data, for example, data of reference values used for processing of the display control method according to the present embodiment such as the area Smin of the setting reference region, image data, and applications. As the storage unit (not shown), for example, a magnetic recording medium such as a hard disk and nonvolatile memory such as EEPROM (Electrically Erasable and Programmable Read Only Memory) and flash memory can be cited. The storage unit (not shown) may be removable from the display control apparatus 100.

For example, an operation input device described later can be cited as the operation unit (not shown) and, for example, a display device described later can be cited as the display unit (not shown). The display control apparatus 100 can also be connected to, for example, an operation input device (for example, a keyboard or mouse) as an external apparatus of the display control apparatus 100.

Hardware Configuration Example of the Display Control Apparatus 100

Figure 10:
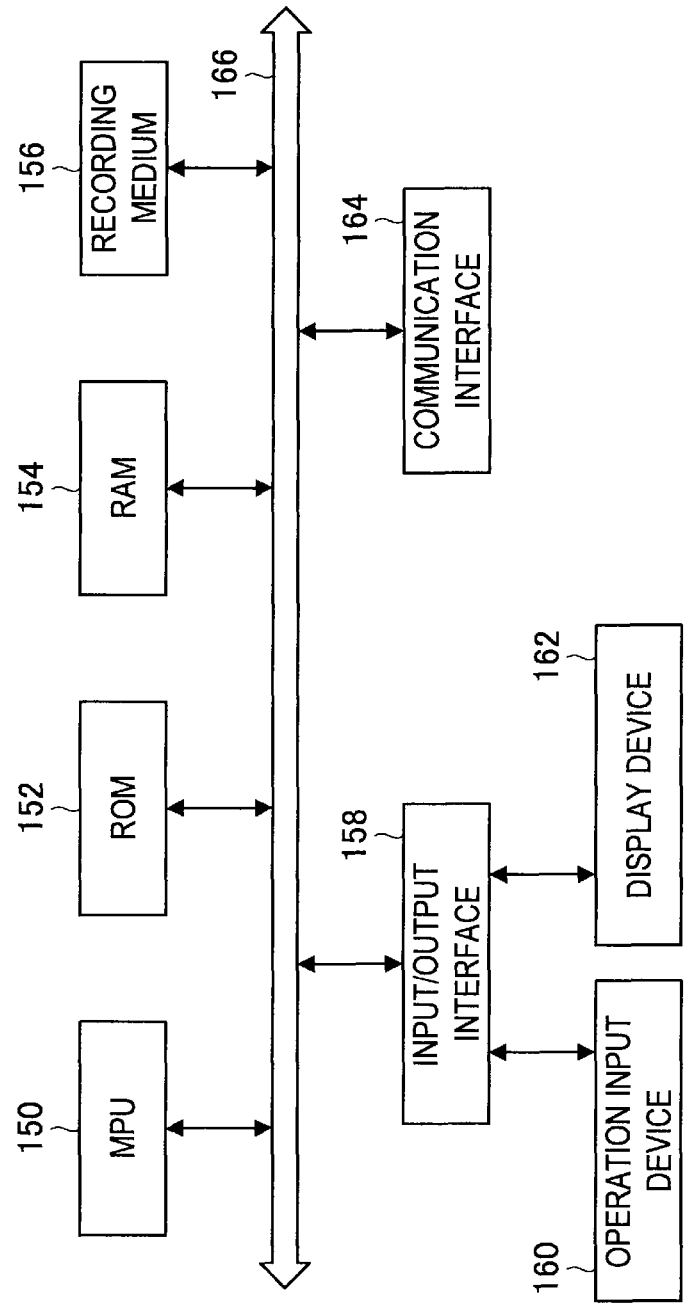
FIG. 10 is an explanatory view exemplifying a hardware configuration of the display control apparatus according to the present embodiment.

FIG. 10 is an explanatory view exemplifying the hardware configuration of the display control apparatus 100 according to the present embodiment. The display control apparatus 100 includes, for example, an MPU 150, ROM 152, RAM 154, a recording medium 156, an input/output interface 158, an operation input device 160, a display device 162, and a communication interface 164. The display control apparatus 100 connects each of the above structural elements by, for example, a bus 166 as a transmission path of data.

The MPU 150 is configured by, for example, an MPU (Micro Processing Unit) or various processing circuits and functions as the control unit 104 that controls the whole display control apparatus 100. The MPU 150 also plays the role of a region setting unit 110, a display content setting unit 112, and a display control unit 114 described later in the display control apparatus 100.

The ROM 152 stores programs and control data such as arithmetic parameters used by the MPU 150. The RAM 154 temporarily stores programs executed by the MPU 150 and the like.

The recording medium 156 functions as the recording unit (not shown) and stores various kinds of data, for example, data of reference values used for processing of the display control method according to the present embodiment such as the area Smin of the setting reference region, image data, and applications. As the recording medium 156, for example, a magnetic recording medium such as a hard disk and nonvolatile memory such as flash memory can be cited. The recording medium 156 may be removable from the display control apparatus 100.

The input/output interface 158 connects, for example, the operation input device 160 or the display device 162. The operation input device 160 functions as the operation unit (not shown) and the display device 162 functions as the display unit (not shown). As the input/output interface 158, for example, a USB (Universal Serial Bus) terminal, DVI (Digital Visual Interface) terminal, HDMI (High-Definition Multimedia Interface) terminal, and various processing circuits can be cited. The operation input device 160 is installed, for example, on the display control apparatus 100 and connected to the input/output interface 158 inside the display control apparatus 100. As the operation input device 160, for example, a rotating selector such as a button, direction key, and jog dial or a combination thereof can be cited. The display device 162 is installed, for example, on the display control apparatus 100 and connected to the input/output interface 158 inside the display control apparatus 100. As the display device 162, for example, a liquid crystal display (LCD) and organic electroluminescence display (also called an OLED display (organic light emitting diode display)) can be cited. It is needless to say that the input/output interface 158 can be connected to external devices such as the operation input device (for example, a keyboard or mouse), display device (for example, the display apparatus 400), and imaging device (for example, the imaging apparatus 500) as external apparatuses of the display control apparatus 100. The display device 162 may be a device allowing both the display and user operations such as a touch screen.

The communication interface 164 is a communication function included in the display control apparatus 100 and function as the communication unit 102 to perform communication by radio/by wire with an external apparatus, for example, the display apparatus 400, the imaging apparatus 500, and a server via the network 300 (or directly). As the communication interface 164, for example, a communication antenna, RF (radio frequency) circuit (radio communication), IEEE802.15.1 port and transmission/reception circuit (radio communication), IEEE802.11b port and transmission/reception circuit (radio communication), and LAN (Local Area Network) terminal and transmission/reception circuit (communication by wire) can be cited.

With the configuration shown, for example, in FIG. 10, the display control apparatus 100 performs processing of a display control method according to the present embodiment. Incidentally, the hardware configuration of the display control apparatus 100 according to the present embodiment is not limited to the configuration shown in FIG. 10.

For example, the display control apparatus 100 may include an imaging device playing the role of the imaging unit (not shown). As the imaging device according to the present embodiment, for example, an imaging device configured by a lens/image pickup device and signal processing circuit can be cited. The lens/image pickup device is configured by, for example, an optical lens and an image sensor using a plurality of image pickup devices such as CCD (Charge Coupled Device) and CMOS (Complementary Metal Oxide Semiconductor). The signal processing circuit includes, for example, an AGC (Automatic Gain Control) circuit and an ADC (Analog to Digital Converter) and converts an analog signal generated by the image pickup device into a digital signal (image data) to perform processing of various signals. The signal processing performed by the signal processing circuit includes, for example, white balance correction processing, color correction processing, gamma correction processing, YCbCr conversion processing, and edge enhancement processing.

The display control apparatus 100 may also include a detection sensor that plays the role of the detection unit (not shown). As the detection sensor according to the present embodiment, for example, a sensor involved in detection of target objects such as a distance sensor, infrared sensor, and an object detection sensor can be cited.

If the display control apparatus 100 does not perform communication with external apparatuses (for example, the display in the display screen of the display unit (not shown) included in the display control apparatus 100 is controlled without controlling the display in the display screen of an external display apparatus such as the display apparatus 400), the display control apparatus 100 may be configured by excluding the communication interface 164.

An example of the configuration of the display control apparatus 100 according to the present embodiment will be described with reference to FIG. 9 again. The communication unit 102 is a communication means included in the display control apparatus 100 and performs communication with an external apparatus such as the display apparatus 400, the imaging apparatus 500, and a server via the network 300 (or directly) by radio/by wire via the network 300 (or directly). Communication by the communication unit 102 is controlled by, for example, the control unit 104. As the communication unit 102, for example, a communication antenna, RF circuit, LAN terminal, and transmission/reception circuit can be cited, but the configuration of the communication unit 102 is not limited to the above example. For example, the communication unit 102 can take any configuration capable of communicating with external apparatuses via the network 300.

The control unit 104 is configured by, for example, an MPU and plays the role of controlling the whole display control apparatus 100. The control unit 104 includes, for example, the region setting unit 110, the display content setting unit 112, and the display control unit 114 and plays the leading role of performing processing of a display control method according to the present embodiment.

The region setting unit 110 plays the leading role of performing the processing (clipping region setting processing) of (1) and sets a clipping region based on, for example, images to be displayed and captured images. More specifically, the region setting unit 110 sets a clipping region by performing, for example, processing corresponding to the processing (clipping region setting processing) of (1) in the processing according to the first example to the processing according to the fifth example of the display control method described above.

The display content setting unit 112 plays the leading role of performing the processing (display content setting processing) of (2) and sets display content to be displayed in the clipping region set by the region setting unit 110. More specifically, the display content setting unit 112 sets display content by performing, for example, processing corresponding to the processing (display content setting processing) of (2) in the processing according to the first example to the processing according to the fifth example of the display control method described above.

The display control unit 114 plays the leading role of performing the processing (display control processing) of (3) and causes the display screen to display images in which the display content set by the display content setting unit 112 is displayed in the clipping region set by the region setting unit 110. More specifically, the display control unit 114 causes the display screen to display the images by performing, for example, processing corresponding to the processing (display control processing) of (3) in the processing according to the first example to the processing according to the fifth example of the display control method described above.

The control unit 104 plays the leading role of performing processing of a display control method according to the present embodiment by including, for example, the region setting unit 110, the display content setting unit 112, and the display control unit 114. It is needless to say that the configuration to realize the processing of the display control method according to the present embodiment is not limited to the configuration of the control unit 104 shown in FIG. 9.

With the configuration shown in, for example, FIG. 9, the display control apparatus 100 performs the processing (for example, the processing (clipping region setting processing) of (1) to the processing (display control processing) of (3)) of the display control method according to the present embodiment. Therefore, with the configuration shown in, for example, FIG. 9, the display control apparatus 100 can cause users viewing images shown in the display screen to recognize that display content displayed in the display screen is intended for the respective users.

FIG. 9 shows an example in which the display control apparatus 100 controls the display in the display screen of the display apparatus 400, which is an external display apparatus, but the configuration of the display control apparatus 100 according to the present embodiment is not limited to the configuration shown in FIG. 9. If, for example, the display control apparatus 100 includes a display unit (not shown), the display control apparatus 100 can control the display in the display screen of the display unit (not shown).

If the display in the display screen of the display unit (not shown) is controlled, the display control apparatus 100 can be configured by excluding the communication unit 102 (so-called standalone configuration). Also if the display in the display screen of the display unit (not shown) is controlled, the display control apparatus 100 may include, for example, an imaging unit (not shown) that images the display direction of the display screen of the display unit (not shown). The display control apparatus 100 may further include a detection unit (not shown).

As described above, the display control apparatus 100 according to the present embodiment performs, for example, the processing (clipping region setting processing) of (1) to the processing (display control processing) of (3) as the processing of a display control method according to the present embodiment. By performing the processing of (1) to the processing of (3), the display control apparatus 100 causes, as shown, for example, in FIG. 1B, the display screen to display images in which display content set to clipping regions corresponding to target objects detected from a captured image is displayed. By setting a clipping region for each target object and causing the display screen to display images in which display content is displayed in each set clipping region, as described above, users can more easily recognize whether content displayed in clipping regions set in displayed images is intended for the respective users.

Therefore, the display control apparatus 100 can cause users viewing images shown in the display screen to recognize that display content displayed in the display screen is intended for the respective users.

Even if, for example, the size of the display screen is large, the display control apparatus 100 sets a clipping region for each target object and causes the display screen to display images in which display content is displayed in each set clipping region. Thus, even if a user viewing the display screen is positioned at a long distance from the display screen or positioned at a short distance from the display screen, the user can recognize that the content displayed in a clipping region is intended for the user. Even if a user is positioned at such a short distance from the display screen that it is difficult for the user to get a bird's eye view of the whole display screen, the display control apparatus 100 can cause the display screen to display images in which display content intended for the user is displayed in the clipping region corresponding to the user.

In the foregoing, the present embodiment has been described by taking the display control apparatus 100 as an example, but the present embodiment is not limited to such a mode. The present embodiment can be applied to various devices such as a computer like a PC (personal computer) and server, a display apparatus such as a TV set and signage apparatus, a projector, a video/music playback apparatus (or video/music recording and playback apparatus), and a game machine. The present embodiment may also be applied to a processing IC (integrated circuit) that performs processing of a display control method according to the present embodiment and embedded in one of the above devices.

Program According to the Present Embodiment

Users viewing images shown in the display screen can be caused to recognize that display content displayed in the display screen is intended for the respective users by a program (for example, a program capable of performing processing of a display control method according to the present embodiment such as the processing (clipping region setting processing) of (1) to the processing (display control processing) of (3)) causing a computer to function as a display control apparatus according to the present embodiment.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, that a program (computer program) to cause a computer to function as a display control apparatus according to the present embodiment is provided is shown above and further, a recording medium in which the program is stored can also be provided together.

The aforementioned configuration is an example of this embodiment. It is obvious that such a configuration is within the technical scope of the present disclosure.

Particular embodiments of the present disclosure include the following.

A display control method including: defining at least one clipping region, within an image to be displayed, according to detected object information; and defining clipping region content for displaying in the clipping region.

The method according to (1), wherein the image to be displayed is a still image.

The method according to (1), wherein the image to be displayed is a dynamic image.

The method according to (1), (2) or (3), further including displaying the image to be displayed with the clipping region content displayed in the at least one clipping region of the image to be displayed.

The method according to any one of (1) to (4), wherein the detected object information is detected on the basis of a captured image.

The method according to (5) wherein the captured image is an image corresponding to a display direction of a display screen.

The method according to (5) or (6), wherein the detected object information is detected by performing face detection on the captured image.

The method according to any one of (1) to (7), wherein the detected object information is information indicating an object's distance from a display screen.

The method according to any one of (1) to (7), wherein the detected object information is information indicating a number of detected objects.

The method according to any one of (1) to (9), wherein the clipping region content is advertisement content.

The method according to any one of (1) to (7) and (10), wherein the detected object information is information indicating that a detected object is one of a male person and a female person.

The method according to any one of (1) to (7) and (10), wherein the detected object information is information indicating an age group of a person.

The method according to any one of (1) to (7) and (10), wherein the detected object information is information indicating a size of a detected object.

The method according to any one of (1) to (13), wherein the clipping region content is related to the detected object.

The method according to any one of (1) to (14), further including changing the clipping region content based on a size of at least one clipping region.

The method according to any one of (1) to (15), further including changing the clipping region content based on a distance between a detected object and a display screen.

The method according to any one of (1) to (16), wherein at least one clipping region corresponds to two or more detected objects.

A display control apparatus including: means for defining at least one clipping region, within an image to be displayed, according to detected object information; and means for defining clipping region content for displaying in the clipping region.

A display control apparatus including a processing circuit for: defining at least one clipping region, within an image to be displayed, according to detected object information, and defining clipping region content for displaying in the clipping region.

A non-transitory computer-readable medium having stored thereon a computer-readable program for implementing a display control method including: defining at least one clipping region, within an image to be displayed, according to detected object information; and defining clipping region content for displaying in the clipping region.

What is claimed is:

1. A display control method, comprising:
   in a display control apparatus:
   displaying a first image on a display screen;
   detecting at least one object from a second image captured by an imaging apparatus;
   identifying a region, that is occupied by a third image of the at least one object, within the displayed first image;
   comparing an area of the identified region with a threshold value;
   setting the identified region as a clipping region based on the comparison;
   defining clipping region content; and
   displaying the defined clipping region content in the clipping region on the display screen.

2. The display control method as recited in claim 1, wherein the first image is a still image.

3. The display control method as recited in claim 1, wherein the first image is a dynamic image.

4. The display control method as recited in claim 1, further comprising displaying the first image with the clipping region content.

5. The display control method as recited in claim 1, wherein the captured second image is an image corresponding to a display direction of the display screen.

6. The display control method as recited in claim 1, wherein the at least one object is detected based on face detection on the captured second image.

7. The display control method as recited in claim 1, further comprising detecting object information indicating a number of the at least one object.

8. The display control method as recited in claim 1, wherein the clipping region content is advertisement content.

9. The display control method as recited in claim 1, further comprising detecting object information indicating that at least one object is one of a male person or a female person.

10. The display control method as recited in claim 9, wherein the detected object information further includes information indicating an age group of a person.

11. The display control method as recited in claim 1, further comprising detecting object information indicating a size of the at least one object.

12. The display control method as recited in claim 1, wherein the clipping region content is related to the at least one object.

13. The display control method as recited in claim 1, further comprising changing the clipping region content based on a size of the clipping region.

14. The display control method as recited in claim 1, further comprising changing the clipping region content based on a distance between the at least one object and the display screen.

15. A display control apparatus, comprising:
one or more processors configured to:
control a display screen to display a first image;
detect at least one object from a second image captured by an imaging apparatus;
identify a region, that is occupied by a third image of at least one object, within the displayed first image;
compare an area of the identified region with a threshold value;
set the identified region as a clipping region based on the comparison;
define clipping region content; and
control the display screen to further display the defined clipping region content in the clipping region.

16. A non-transitory computer-readable medium having stored thereon, computer-executable instructions which when executed by a computer, cause the computer to execute operations, the operations comprising:
displaying a first image on a display screen;
detecting at least one object from a second image captured by an imaging apparatus;
identifying a region, that is occupied by a third image of the at least one object, within the displayed first image;
comparing an area of the identified region with a threshold value;
setting the identified region as a clipping region based on the comparison;
defining clipping region content; and
displaying the defined clipping region content in the clipping region on the display screen.

17. The display control method as recited in claim 1, further comprising detecting object information indicating a distance of the at least one object from the display screen.

18. The display control method as recited in claim 1, further comprising:
comparing an amount of movement of the at least one object with a reference amount of movement; and
setting the identified region as the clipping region based on the comparison of the amount of movement with the reference amount of movement.

* * * * *